US009699051B2

(12) United States Patent
Rată et al.

(10) Patent No.: US 9,699,051 B2
(45) Date of Patent: Jul. 4, 2017

(54) METHODS, SYSTEMS, AND COMPUTER READABLE MEDIA FOR ONE-WAY LINK DELAY MEASUREMENT

(71) Applicant: Ixia, Calabasas, CA (US)

(72) Inventors: Marian Rată, Bucharest (RO); Codrut Dumitru Rădoi, Bucharest (RO); Vlad Stanciu, Bucharest (RO); Bogdan Tenea, Bucharest (RO)

(73) Assignee: IXIA, Calabasas, CA (US)

( * ) Notice: Subject to any disclaimer, the term of this patent is extended or adjusted under 35 U.S.C. 154(b) by 116 days.

(21) Appl. No.: 14/685,552

(22) Filed: Apr. 13, 2015

(65) Prior Publication Data

US 2016/0301589 A1    Oct. 13, 2016

(30) Foreign Application Priority Data

Apr. 10, 2015 (RO) .................................... 15-00264

(51) Int. Cl.
*H04J 1/16* (2006.01)
*H04L 1/00* (2006.01)
*H04L 12/26* (2006.01)

(52) U.S. Cl.
CPC ........ *H04L 43/0858* (2013.01); *H04L 43/106* (2013.01)

(58) Field of Classification Search
None
See application file for complete search history.

(56) References Cited

U.S. PATENT DOCUMENTS 6,868,069 B2    3/2005   Knobbe et al.
7,092,586 B2    8/2006   Vokey et al.
(Continued)

FOREIGN PATENT DOCUMENTS

WO    WO 2011/144263 A1    11/2011
WO    WO 2016/168063 A1    10/2016
WO    WO 2016/168064 A1    10/2016

OTHER PUBLICATIONS

"High Density Modular Fiber Tap," Ixia, http://www.ixiacom.com/products/net-optics-flex-tap, pp. 1-4 (Jul. 2014).
(Continued)

*Primary Examiner* — Bob Phunkulh
(74) *Attorney, Agent, or Firm* — Jenkins, Wilson, Taylor & Hunt, P.A.

(57) ABSTRACT

A method for measuring one-way link delay includes transmitting a first packet from a first network device. The first packet is passively intercepted, a first copy of the first packet is transmitted to the first network device, and a second copy of the first packet is transmitted to a second network device. A time of receipt of the first copy of the first packet is recorded as an origin timestamp at the first network device. A time of receipt of the second copy of the first packet is recorded as a receive timestamp at the second network device. A second packet including the origin timestamp is transmitted from the first network device. The second packet is passively intercepted, and a first copy of the second packet is transmitted to the second network device. The first copy of the second packet is received at the second network device, and the origin timestamp is extracted from the first copy of the second packet. Link delay from the first network device to the second network device is calculated using the origin timestamp and the receive timestamp.

22 Claims, 4 Drawing Sheets

(56) References Cited

U.S. PATENT DOCUMENTS

| | | |
|---|---|---|
| 7,881,209 B2 | 2/2011 | Beliles, Jr. et al. |
| 8,718,482 B1 | 5/2014 | Roberts |
| 8,767,565 B2 | 7/2014 | Dalmau et al. |
| 9,130,945 B2 | 9/2015 | Smith et al. |
| 9,380,070 B1 | 6/2016 | Cain et al. |
| 2003/0105976 A1 | 6/2003 | Copeland, III |
| 2004/0190547 A1 | 9/2004 | Gordy et al. |
| 2007/0268938 A1 | 11/2007 | Dowd |
| 2009/0231191 A1 | 9/2009 | Wu et al. |
| 2011/0170534 A1 | 7/2011 | York |
| 2011/0199133 A1 | 8/2011 | Yamada |
| 2011/0211473 A1* | 9/2011 | Matityahu ............... H04L 47/10 370/252 |
| 2012/0166327 A1 | 6/2012 | Amicangioli |
| 2012/0275317 A1 | 11/2012 | Geva |
| 2013/0080817 A1 | 3/2013 | Mihelic |
| 2013/0094515 A1* | 4/2013 | Gura ....................... H04L 47/00 370/419 |
| 2013/0173778 A1 | 7/2013 | Hsy et al. |
| 2013/0212439 A1 | 8/2013 | Stevens et al. |
| 2013/0259049 A1 | 10/2013 | Mizrahi |
| 2013/0265886 A1 | 10/2013 | Leong |
| 2013/0278312 A1 | 10/2013 | Getzin et al. |
| 2013/0329595 A1* | 12/2013 | Scholz .................... H04L 43/08 370/252 |
| 2013/0343207 A1 | 12/2013 | Cook et al. |
| 2013/0347103 A1 | 12/2013 | Veteikis et al. |
| 2014/0006610 A1 | 1/2014 | Formby et al. |
| 2014/0185632 A1 | 7/2014 | Steiner et al. |
| 2014/0297852 A1* | 10/2014 | Shimizu ................ H04L 7/0016 709/224 |
| 2014/0317288 A1* | 10/2014 | Krueger .............. H04L 41/5025 709/224 |
| 2014/0321285 A1 | 10/2014 | Chew et al. |
| 2014/0344930 A1* | 11/2014 | Foley .................. H04L 63/1425 726/23 |
| 2015/0016274 A1* | 1/2015 | Holland ................ H04W 24/04 370/242 |
| 2015/0023168 A1* | 1/2015 | Kotecha ............ H04W 28/0289 370/232 |
| 2015/0023170 A1* | 1/2015 | Kakadia .............. H04L 41/0823 370/235 |
| 2015/0281025 A1* | 10/2015 | Wallbaum ........... H04L 43/0829 370/252 |
| 2016/0065434 A1* | 3/2016 | Janakiraman ....... H04L 43/0852 370/252 |
| 2016/0110211 A1* | 4/2016 | Karnes ................ G06F 9/45558 718/1 |
| 2016/0285575 A1* | 9/2016 | Holmeide ............. H04J 3/0661 |
| 2016/0301599 A1 | 10/2016 | Porfiri et al. |
| 2016/0306726 A1 | 10/2016 | Regev |
| 2016/0309434 A1 | 10/2016 | Regev |
| 2016/0315756 A1 | 10/2016 | Tenea et al. |

OTHER PUBLICATIONS

"Ixia Anue 3500—Mobile Backhaul Testing Solution," Ixia Data Sheet, pp. 1-5 (Dec. 2013).

Non-Final Office Action for U.S. Appl. No. 14/860,630 (Dec. 19, 2016).

Notification of Transmittal of the International Search Report and the Written Opinion of the International Searching Authority, or the Declaration for International Application No. PCT/US2016/040532 (Sep. 12, 2016).

Commonly-assigned, co-pending International Application No. PCT/US16/40532 for "Methods, Systems, and Computer Readable Media for Detecting Physical Link Intrusions," (Unpublished, filed Jun. 30, 2016).

Non-Final Office Action for U.S. Appl. No. 14/688,630 (Oct. 17, 2016).

Non-Final Office Action for U.S. Appl. No. 13/933,661 (Sep. 27, 2016).

Notification of Transmittal of the International Search Report and the Written Opinion of the International Searching Authority, or the Declaration for International Application No. PCT/US2016/040523 (Sep. 12, 2016).

Notification of Transmittal of the International Search Report and the Written Opinion of the International Searching Authority, or the Declaration for International Application No. PCT/US2016/026534 (Jul. 8, 2016).

Notification of Transmittal of the International Searh report and the Written Opinion of the International Searching Authority, or the Declaration for International Application No. PCT/US2016/026533 (Jul. 8, 2016).

Final Office Action for U.S. Appl. No. 13/933,661 (Apr. 12, 2016).

Non-Final Office Action for U.S. Appl. No. 13/933,661 (Dec. 14, 2015).

Commonly-assigned, co-pending U.S. Appl. No. 14/860,630 for "Methods, Systems, and Computer Readable Media for Detecting Physical Link Intrusions," (Unpublished, filed Sep. 21, 2015).

Commonly-assigned, co-pending U.S. Appl. No. 14/819,337 for "Modeling a Clock," (Unpublished, filed Aug. 5, 2015).

"Network Time Protocol," Wikipedia, https://en.wikipedia.org/wiki/Network_Time_Protocol, pp. 1-7 (Jul. 3, 2015).

Commonly-assigned, co-pending U.S. Appl. No. 14/688,630 for "Methods, Systems, and Computer Readable Media for Synchronizing Timing Among Network Interface Cards (NICs) in a Network Equipment Test Device," (Unpublished, filed Apr. 16, 2015).

Commonly-assigned, co-pending U.S. Appl. No. 14/688,644 for "Methods, Systems, and Computer Readable Media for Emulating Network Devices with Different Clocks," (Unpublished, filed Apr. 16, 2015).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).

"AN-1838 IEEE 1588 Boundary Clock and Transparent Clock Implementation Using the DP83640," Application Report, Texas Instruments, pp. 1-9 (Apr. 2013).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

\* cited by examiner

METHODS, SYSTEMS, AND COMPUTER READABLE MEDIA FOR ONE-WAY LINK DELAY MEASUREMENT

PRIORITY CLAIM

This application claims the benefit of Romanian Patent Application No. a 2015 00264 filed Apr. 10, 2015; the disclosure of which is incorporated herein by reference in its entirety.

TECHNICAL FIELD

The subject matter described herein relates to measuring link delay. More particularly, the subject matter described herein relates to measuring one-way link delay in networks, including but not limited to asymmetric networks.

BACKGROUND

In computer networks, it is often desirable to measure link delay between network equipment located in different geographic locations. In symmetric networks where the link delay is the same or nearly the same in both directions between two locations, the one-way link delay (i.e., the delay in one direction from one device to a remote device) can be measured by transmitting a packet from one location to the other and back, recording the round-trip time, and dividing the round-trip time by two. However, in asymmetric networks, the delay in one direction is different from the delay in the other direction. As a result, dividing the round-trip time by two is an inaccurate measure of one-way link delay in asymmetric networks.

One method for measuring link delay in an asymmetric network is to use specialized equipment that is capable of egress packet time stamping and swapping the roles of receive and transmit ports to determine the link delay in each direction. For example, some optical networking equipment includes transmit and receive ports whose roles can be reversed. To measure link delay in one direction, a packet can be sent from a transmit port of one device to a receive port of another device. The outgoing packet is time stamped by the transmitting device and its time of receipt is recorded by the receiving device using its local time. The roles of the receive and transmit ports are then reversed and the process is repeated in the opposite direction, by also adding the receive time of the first packet. The one-way link delay can be determined based on the difference between the transmit and receive times of the packet of both the forward and the reverse path.

It may be desirable to measure link delay in optical, wireless, or electrical networks where specialized network equipment capable of port role reversal is not available. In addition, some network equipment may not be able to generate timestamps for outgoing packets. In such networks, another mechanism needs to be provided to accurately measure one-way link delay.

Accordingly, there exists a need for methods, systems, and computer readable media for measuring one-way link delay.

SUMMARY

The subject matter described herein relates to methods, systems, and computer readable media for measuring one-way link delay. A method for measuring one-way link delay includes transmitting a first packet from a first network device. The first packet is passively intercepted, a first copy of the first packet is transmitted to the first network device, and a second copy of the first packet is transmitted to a second network device. A time of receipt of the first copy of the first packet is recorded as an origin timestamp at the first network device. A time of receipt of the second copy of the first packet is recorded as a receive timestamp at the second network device. A second packet including the origin timestamp is transmitted from the first network device. The second packet is passively intercepted, and a first copy of the second packet is transmitted to the second network device. The first copy of the second packet is received at the second network device, and the origin timestamp is extracted from the first copy of the second packet. Link delay from the first network device to the second network device is calculated using the origin timestamp and the receive timestamp.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for measuring one-way link delay. The subject matter described herein may be useful to measure one-way link delay in asymmetric networks, such as long haul optical networks or wireless networks where the delay in one direction is not equal to the delay in the opposite direction. However, the subject matter described herein is not limited to measuring one-way link delay in asymmetric networks, optical networks, or wireless networks. The link delay measurement mechanisms described herein can be used to measure link delay in any network, including synchronous networks, wired electrical networks, or any other type of network where the link delay is symmetric or asymmetric.

In symmetric networks, it may be simpler to measure the packet round-trip time and divide by two to get the one-way link delay. For example, the transmitting device, assuming it is capable of time stamping outgoing packets, can time stamp a packet, transmit the packet to a remote device, receive the packet from the remote device, determine the round-trip time by subtracting the transmit time from the time of receipt, and calculate the one-way link delay by dividing the difference by two. However, such a metric is really just an average of the one-way link traversal time and may not accurately measure the one-way link delay when there is any amount of asymmetry in the link delay. The subject matter described herein avoids the inaccuracy by measuring the one-way link delay using packet link traversal times for the direction being measured. That is, the link delay measured for a packet in one direction depends on the packet traversal time in that direction instead of the average traversal time of two directions. In addition, the one-way link delay measurement mechanisms described herein can be used to measure link delay in both directions over a link, by individually measuring the one-way link delay in each direction.

Figure 1:
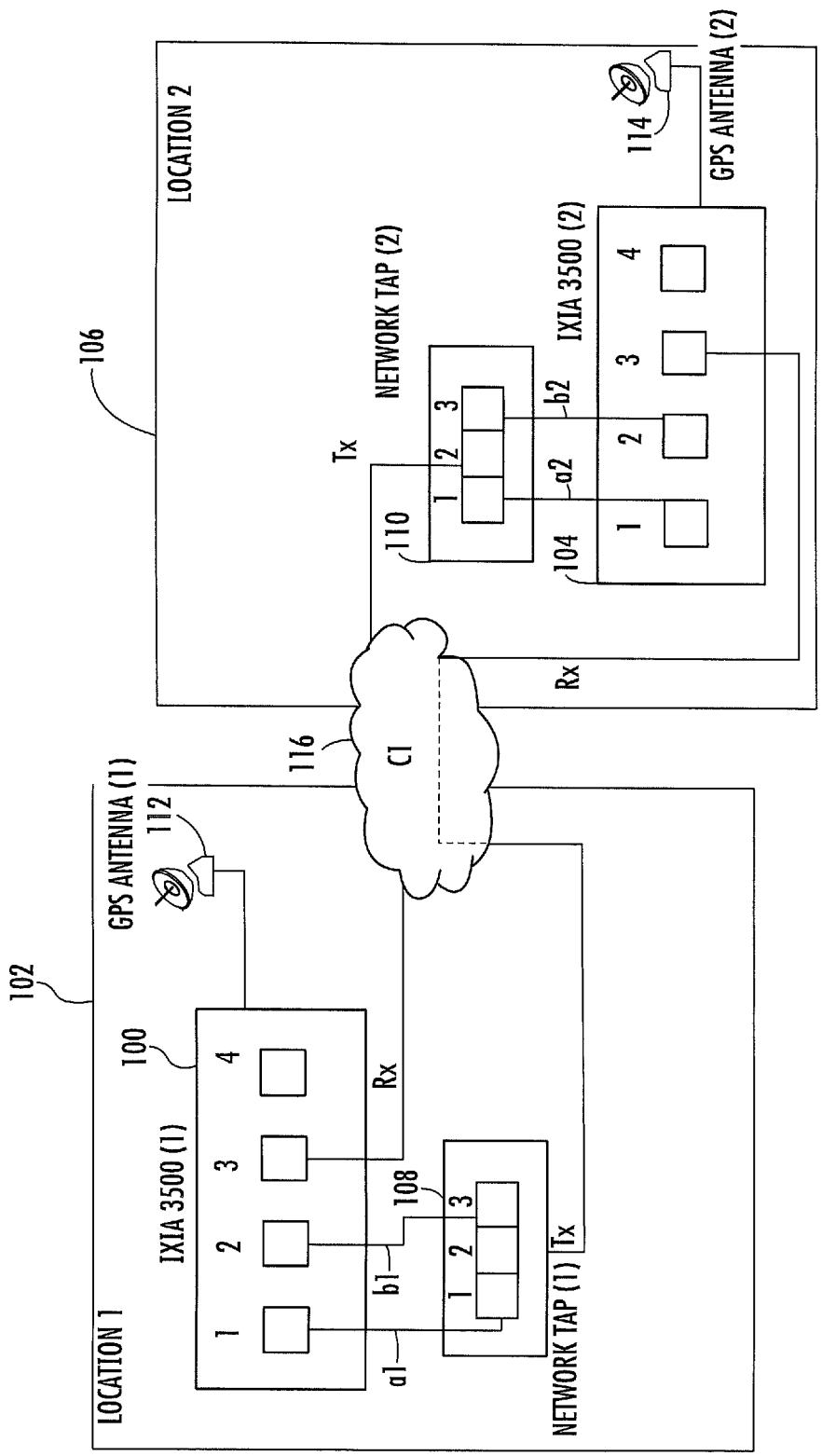
FIG. 1 is a block diagram illustrating a system for measuring one-way link delay according to an embodiment of the subject matter described herein.

FIG. 1 is a network diagram illustrating a system for measuring one-way link delay according to an embodiment of the subject matter described herein. Referring to FIG. 1, a first network device 100 is located in a first geographic location 102 and a second network device 104 is located in a second geographic location 106. In the illustrated example, network devices 100 and 104 are Ixia 3500 network equipment test devices. The Ixia 3500 device is a test platform used to measure timing, synchronization, quality of service, and other performance metrics associated with network devices. One limitation of the current Ixia 3500 device is the inability to generate timestamps for outgoing packets. However, the subject matter described herein avoids this limitation using network taps 108 and 110 local to network devices 100 and 104, respectively passively intercept and transmit copies of outgoing packets to network devices 100 and 104 so that the ingress packet time stamping capability of network devices 100 and 104 can be used to generate egress or origin timestamps for the packet copies, and network devices 100 and 104 can use the ingress timestamps as egress timestamps for the outgoing packets transmitted to the remote network device.

In FIG. 1, each network tap 108 and 110 is capable of receiving a packet and transmitting copies of the received packet on multiple different ports. As will be described in detail below, in order to generate an origin timestamp, network tap 108 may loop a copy of the transmitted packet back into network device 100. Network device 100, using its ingress time stamping capability, may time stamp the received copy of the packet and the receive timestamp may be used as an origin timestamp for the packet in calculating link delay from network device 100 to network device 104. Network taps 108 and 110 may include electrical network interfaces, optical network interfaces, wireless network interfaces, or any combination thereof. An example of a network tap suitable for use with embodiments of the subject matter described herein is any of the Ixia/Net Optics taps available from Ixia. Other suitable taps that are capable of transmitting copies of received packets on multiple ports may be used without departing from the scope of the subject matter described herein.

In order to accurately measure link delay, network devices 100 and 104 may be synchronized to a common time source or to each other. Any suitable time source and synchronization method may be used. In the illustrated example, each network device 100 and 104 is connected to a global positioning system (GPS) antenna. More particularly, network device 100 is connected to GPS antenna 112 and network device 104 is connected to GPS antenna 114. Signals received from GPS satellites via antennas 112 and 114 may include GPS timing information, which is the same throughout the GPS system. Accordingly, in one example, each network device 100 and 104 may receive GPS signals via its respective GPS antenna and synchronize its ingress packet timestamp capability to the time received in the GPS signals. Because network devices 100 and 104 are synchronized to a common time source, they are also synchronized to each other, and timestamps generated by network devices 100 and 104 are consistent with each other.

In the example illustrated in FIG. 1, geographic sites 102 and 106 are separated by a network 116. Network 116 may be a wireless network, an optical network, an electrical network, or a combination of any of these network types. In the examples described below, it will be assumed that network 116 is an asymmetric network where the link delay from geographic site 102 to 106 is different from the link delay from site 106 to site 102.

Figure 2:
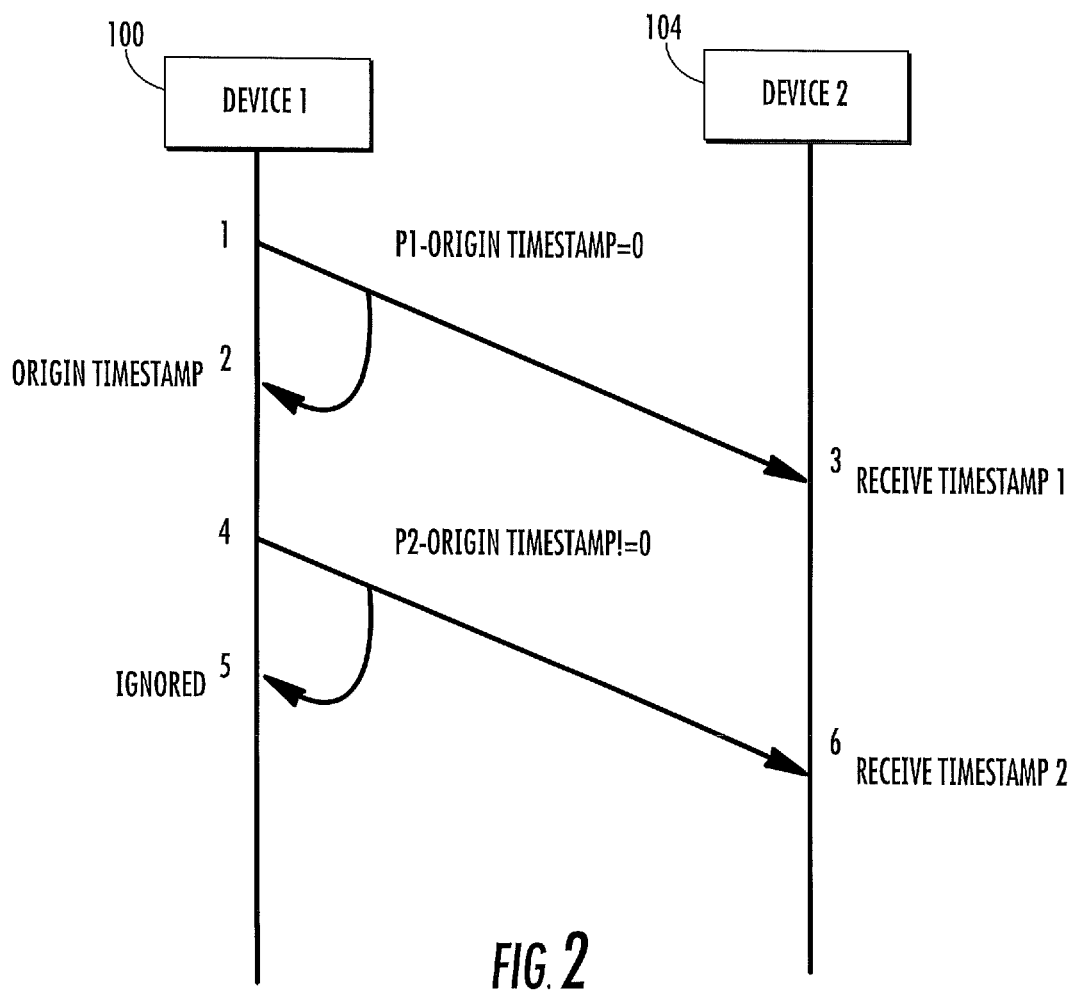
FIG. 2 is a message flow diagram illustrating a process for measuring one-way link delay according to an embodiment of the subject matter described herein.

FIG. 2 is a message flow diagram illustrating a method for measuring one-way link delay according to an embodiment of the subject matter described herein. Referring to FIG. 2, in step 1, network device 100 sends a packet P1 with the origin timestamp set to zero in the payload and a sequence ID. Network tap 108 passively intercepts the packet P1 and transmits one copy of the packet P1 back to network device 100 via the output port of network tap 108 connected to device 100 and transmits another copy of the packet P1 to remote network device 104 via the output port of network tap 108 connected to network device 104.

In step 2, network device 100 receives its copy of packet P1 from network tap 108. Network device 100 records, using its ingress time stamping capability, the time of receipt of the copy of packet P1 as the origin timestamp. The origin timestamp is nearly the same time that the original packet P1 was transmitted to device 104 because the network delay in transmitting the packet P1 to network tap 108 and receiving the copy of the packet P1 from network tap 108 is negligible, and network tap 108 is in the same geographic location as device 100 and connected to device 100 using short electrical or optical cables (e.g., one meter or less) without any devices between device 100 and network tap 108. In addition, as will be described in detail below, the delays introduced by network tap 108 and the outgoing cable from device 100 to network tap 108 cancel in the link delay measurement because they are part of both the origin and receive timestamps.

In step 3, network device 104 receives the copy of packet P1 transmitted to network device 104 by network tap 108 and records, using its ingress packet time stamping feature, the time of receipt of the copy of packet P1 as receive timestamp 1 and also records the sequence ID.

In step 4, network device 100 transmits a second packet P2 to network device 104. The second packet P2 will include the same sequence ID as the packet P1. Network device 100 inserts the origin timestamp recorded in step 2 in packet P2. In one example, the origin timestamp may be carried in the payload of the packet P2. In another example, the origin timestamp may be stored in an unused header field of the packet P2.

In step 5, network tap 108 passively intercepts the packet P2, transmits one copy of packet P2 back to network device 100, and transmits another copy of packet P2 to remote device 104. However, network device 100 will ignore the copy of packet P2 because the origin timestamp is not equal to zero. Accordingly, network device 100 discards the copy of packet P2.

In step 6, network device 104 receives the copy of packet P2 transmitted by network tap 108, extracts the origin timestamp, and uses the origin timestamp to calculate the link delay from device 100 to device 104. Device 104 matches the packet P2 with packet P1 using the sequence identifier in packet P2, which is the same as the sequence identifier in packet P1. Device 104 may measure the one-way link delay subtracting the origin timestamp from the receive timestamp for packet P1, considering that both devices are synchronized to a common clock source. Table 1 shown below illustrates examples of operations performed in FIG. 2 by devices 100 and 104.

TABLE 1

Link Delay Measurement Operations

| Transmitted by | Received by | Origin Timestamp | Action |
|---|---|---|---|
| Device 1 | Device 1 | 0 | Save Receive TS, and send it as Origin TS in P2 |
| Device 1 | Device 1 | !0 | Drop packet |
| Device 1 | Device 2 | 0 | Save Received TS |
| Device I | Device 2 | !0 | Save Origin TS from packet |

In Table 1, the actions described above with regard to FIG. 2 are summarized. From the first row (following the header) in Table 1, the origin timestamp in the first packet transmitted by Device 1 is set to zero. Device 1 utilizes the origin timestamp of zero to trigger Device 1 to record the time of receipt of the first packet copy as the origin timestamp for the link delay measurement. In the second row of Table 1, Device 1 uses the non-zero origin timestamp in packet P2 transmitted by Device 1 to allow Device 1 to ignore the copy of packet P2 transmitted by the local network tap back to Device 1. In the third row of Table 1, Device 2 records the time of receipt of packet P1. In one embodiment, Device 2 timestamps all received packets, but the receive timestamp for a given packet is only taken into account in measuring the one-way link delay if the origin timestamp in the packet is set to zero. In the last row of Table 1, Device 2 Device 2 saves the origin timestamp from packet P2. The origin timestamp is used in calculating the one-way link delay from Device 1 to Device 2.

In order to measure link delay in the reverse direction from device 104 to device 100, the roles of device 104 and device 100 illustrated in FIG. 2 may be reversed. That is, device 104 may transmit packet P1 to device 100. Network tap 110 associated with device 104 may passively intercept packet P1, transmit one copy of packet P1 back into device 104 and transmit another copy of packet P1 to device 100. Device 104 may record the time of receipt of the copy of packet P1 transmitted to device 104 by network tap 110. Device 100 may record the time of receipt of the copy of packet P1 transmitted to device 100 by network tap 110. Device 104 may then transmit packet P2 carrying the origin time stamp to device 100. Network tap 110 may passively intercept the packet P2, transmit one copy to device 104 and transmit another copy to device 100. Device 104 may ignore or discard the received copy of packet P2 because the origin timestamp is non-zero. Device 100 may receive the copy of packet P2 transmitted to it by network tap 110 and record the origin timestamp. Device 104 may calculate the link delay from device 104 to device 100 by subtracting the origin timestamp from the time of receipt of packet P1.

Additional Link Delay Measurement Details

The following are additional details regarding link delay measurement using the system illustrated in FIG. 1.
The following naming conventions will be used.
Forward Direction:
  Cable a1: from Ixia 3500 (100), port 1 to Network Tap (108), port 1
  Cable b1: from Network Tap (108), port 3 to Ixia 3500 (100), port 2
  Cable c1 (represents measured network): from Network Tap (108), port 2 to Ixia 3500 (104), port 3
  Network Tap (108) introduces delay: d1
Reverse Direction:
  Cable a2: from Ixia 3500 (104), port 1 to Network Tap (110), port 1
  Cable b2: from Network Tap (110), port 3 to Ixia 3500 (2), port 2 to Ixia 3500 (100), port 3
  Cable c2 (represents measured network in reverse): from Network Tap (110), port 2 to Ixia 3500 (100), port 3
  Network Tap (110) introduces delay: d2
Link Delay Measurement Formula:

$$\text{Receive Timestamp 1} = a1 + d1 + c1 \quad (1)$$

$$\text{Origin Timestamp} = a1 + d1 + b1$$

$$\begin{aligned}
\text{Link Delay Measurement } (LDM) &= (ReceiveTimestamp1 - \\
& \quad OriginTimestamp) \\
&= (a1 + d1 + c1) - (a1 + d1 + b1) \\
&= a1 - a1 + d1 - d1 + c1 - b1 \\
&= c1 - b1
\end{aligned}$$

For b1 and b2 a short cable should be used (<1 m, where 1 m of copper adds ~4 ns delay), which introduces negligible delay Additional delay may be introduced by the synchronization error between the sender and the receiver (GPS signal)

From Equation 1, the cable delay a1 and delay d1 of network tap 108 d1 cancel from the link delay measurement calculation because they are part of both receive timestamp 1 and origin timestamp. The cable delay b1 does not cancel because it is only present in the origin timestamp measurement. Thus, a more precise measurement of the link delay can be obtained by calculating b1, e.g., from delay specifications of the cable used, and adding the calculated cable delay to the link delay measurement obtained using Equation 1. The same applies for the cable delay b2 when the link delay is measured in the reverse direction.

Figure 3:
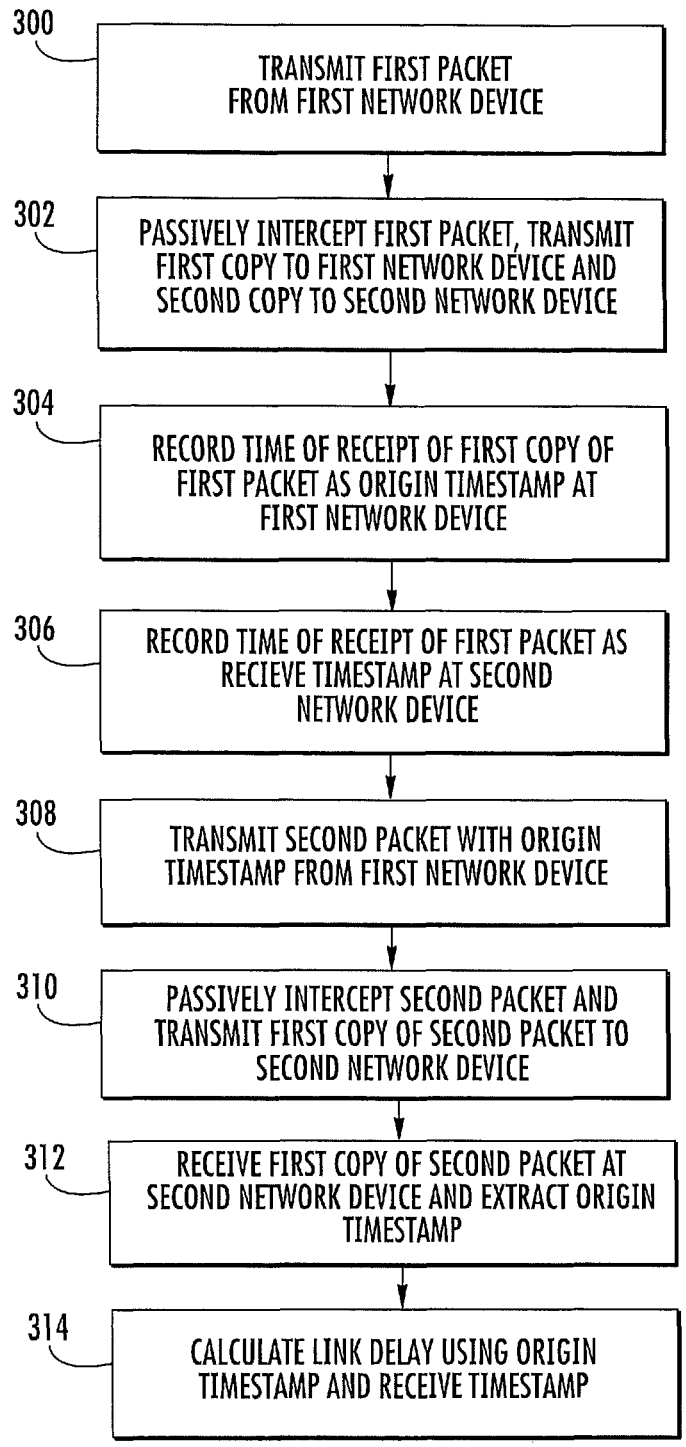
FIG. 3 is a flow chart of a process for measuring one-way link delay according to an embodiment of the subject matter described herein.

FIG. 3 is a flow chart illustrating an exemplary process for measuring one-way link delay according to an embodiment of the subject matter described herein. Referring to FIG. 3, in step 300, a first packet is transmitted from a first network device. For example, the first packet may be an electrical, optical, or wireless packet transmitted from device 100 to device 104.

In step 302, the first packet is passively intercepted, a first copy of the first packet is transmitted to the first network device, and a second copy of the first packet is transmitted to a second network device. For example, network tap 108 may transmit a first copy of the first packet to network device 100 and a second copy of the first packet to device 104.

In step 304, a time of receipt of the first copy of the first packet is recorded as an origin timestamp at the first network device. As stated above, network tap 108 may be in the same geographic location as device 100 and connected to device 100 via a low latency connection, such as a pair of electrical or optical cables. Network tap 108 may also be a low latency device. As a result, the time between transmitting the first packet from network device 100 and receiving the copy of the first packet by network device 100 is negligible, as compared to the link delay between the remote geographic locations.

In step 306, a time of receipt of the second copy of the first packet is recorded as a receive timestamp at the second network device. For example, network device 104 may receive the second copy of the first packet and record the time of receipt of the second copy of the first packet using the local clock of network device 104, which is synchronized with the same source as the clock of network device 100.

In step 308, a second packet with the origin timestamp is transmitted from the first network device. For example, network device 100 may transmit a second packet to network device 104. The second packet may include the origin timestamp recorded for the first packet. In one example, as described above, the origin timestamp may be included in the payload of the second packet. In an alternate example, the origin timestamp may be included in an unused header field.

In step 310, the second packet is passively intercepted, and a first copy of the second packet is transmitted to the second network device. For example, network tap 108 may passively intercept the second packet and transmit a copy to network device 104. A copy may also be transmitted to network device 100, which network device 100 because the origin timestamp in the copy of the second packet is non-zero.

In step 312, the first copy of the second packet is received at the second network device, and the origin timestamp is extracted from the first copy of the second packet. For example, network device 104 may receive the first copy of the second packet. Because the origin timestamp is non-zero, network device may perform the action of extracting the origin timestamp from the payload of the second packet.

In step 314, link delay from the first network device to the second network device is calculated using the origin timestamp and the receive timestamp. For example, network device 104 may receive the first copy of the second packet, which includes the time of receipt of the first packet. The link delay from the first network device to the second network device can be calculated by subtracting the time of receipt of the first copy of packet from the origin timestamp. As stated above with respect to Equation 1, the link delay calculation may be further refined by adding the cable delay between network tap 108 and network device 100 to the link delay calculated using Equation 1. In addition, the link delay may be calculated by network device 104 or by a device separate from network device 104, such as an administrative platform connected to network device 104.

Figure 4:
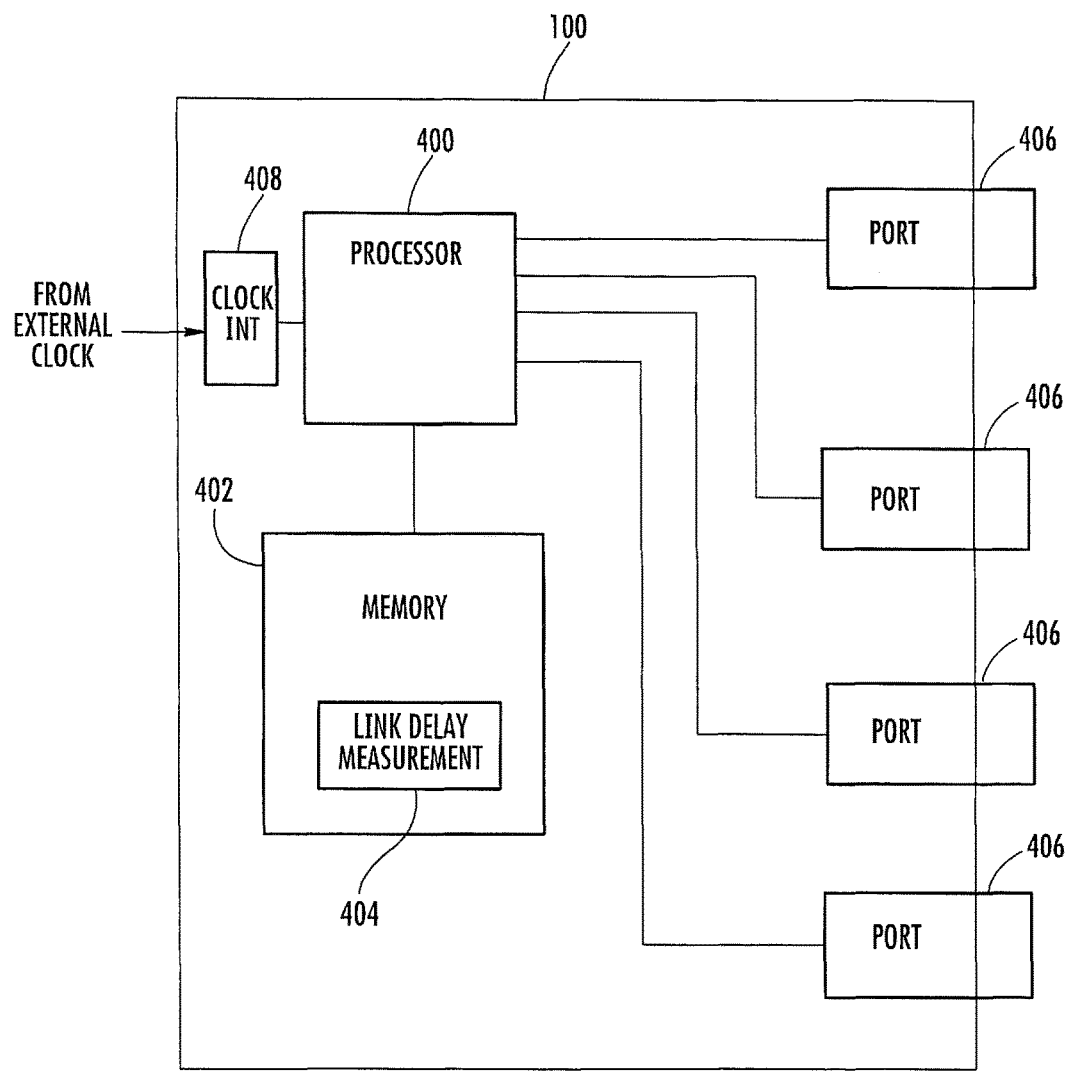
FIG. 4 is a block diagram illustrating a network device suitable for one-way link delay measurement according to an embodiment of the subject matter described herein.

FIG. 4 is a block diagram illustrating an exemplary network device suitable for link delay measurement according to an embodiment of the subject matter described herein. Referring to FIG. 4, network device 100 includes a processor 400 and a memory 402. Memory 402 includes a link delay measurement module 404 that performs the steps of device 100 or device 104 depending on the role of the device in the link delay measurement. For example, if device 100 transmits the initial packet, link delay measurement module 404 may perform the steps of device 100 described above with respect to FIG. 2. If device 100 is performing the link delay calculations, link delay measurement module 404 may perform the steps of device 104 described above with respect to FIG. 2.

In FIG. 4, device 100 includes a plurality of ports 406. Ports 406 may be electrical ports, optical ports, or wireless ports. The function of ports 406 is to transmit packets to and receive packets from a network and to physically connect device 100 with the network via an electrical, optical, or wireless connection. For example, if the connection to the network is an electrical connection, ports 406 may include Ethernet transceivers for transmitting Ethernet frames to and receiving Ethernet frames from the network. If the connection to the network is an optical network, ports 406 may include a SONET transceiver for transmitting SONET frames to and receiving SONET frames from the network. If the connection to the network is a wireless connection, ports 406 may include an IEEE 802.11, LTE, or other wireless transceiver for transmitting wireless frames to and receiving wireless frames from the network. Ports 406 may include any combination of electrical, optical, and wireless transceivers without departing from the scope of the subject matter described herein.

Device 100 further includes a clock interface 408 for receiving clock values from an external clock source. In one example, clock interface 408 may interface with a GPS antenna for receiving a clock from a GPS source. In another example, clock interface 408 may receive an external clock from another reliable clock source, such as an atomic clock. Clock interface 408 is preferably capable of synchronizing device 100 with the external clock. As stated above, device 100 and device 104 may be synchronized to a common external clock source or at least to each other so that timestamps of device 100 and device 104 are consistent with each other.

Thus, using the subject matter described herein, one-way link delay can be measured in symmetric or asymmetric networks, even when the measurement devices lack the ability to time stamp outgoing packets. The subject matter described herein improves the technological field of network delay measurement by using existing hardware to perform delay measurements. The subject matter described herein also improves the functionality of a network equipment test device, such as device 100, by enabling device 100 to measure one-way link delay in asymmetric networks.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for one-way link delay measurement in a network, the method comprising:
transmitting a first packet from a first network device;
using a network tap, passively intercepting the first packet, transmitting a first copy of the first packet to the first network device, and transmitting a second copy of the first packet to a second network device;

at the first network device, recording a time of receipt of the first copy of the first packet as an origin timestamp;

at the second network device, recording a time of receipt of the second copy of the first packet as a receive timestamp;

transmitting a second packet from the first network device, the second packet including the origin timestamp;

using the network tap, passively intercepting the second packet and transmitting a first copy of the second packet to the second network device;

at the second network device, receiving the first copy of the second packet and extracting the origin timestamp from the first copy of the second packet; and calculating link delay from the first network device to the second network device using the origin timestamp and the receive timestamp.

2. The method of claim 1 wherein the first and second network devices comprise network equipment test devices.

3. The method of claim 2 wherein the first and second network equipment test devices are synchronized to a common clock source.

4. The method of claim 3 wherein the common clock source comprises a global positioning system (GPS) clock source.

5. The method of claim 1 wherein the network tap is local to the first network device.

6. The method of claim 5 further comprising transmitting a second copy of the second packet from the network tap to the first network device.

7. The method of claim 6 wherein the first network device discards the second copy of the second packet.

8. The method of claim 6 wherein calculating the link delay using the origin timestamp and the receive timestamp includes subtracting the origin timestamp from the receive timestamp to obtain a link delay measurement.

9. The method of claim 8 wherein calculating the link delay includes adding a cable delay for a cable between the network tap and the first network device to the link delay measurement.

10. The method of claim 1 wherein calculating the link delay using the origin timestamp and the receive timestamp includes subtracting the origin timestamp from the receive timestamp.

11. The method of claim 1 wherein the network comprises an asymmetric network and wherein the method further comprises reversing the roles of the first and second network devices and calculating link delay from the second network device to the first network device.

12. A system for one-way link delay measurement in a network, the system comprising:
a first network device;
a second network derive;
a network tap;
wherein the first network device is configured to transmit a first packet from the first network device;
wherein the network tap is configured to passively intercept the first packet, transmit a first copy of the first packet to the first network device and transmit a second copy of the first packet to the second network device;
wherein the first network device is configured to record a time of receipt of the first copy of the first packet as an origin timestamp;
wherein the second network device is configured to record a time of receipt of the second copy of the first packet as a receive timestamp;
wherein the first network device is configured to transmit a second packet from the first network device, the second packet including the origin timestamp;
wherein the network tap is configured to passively intercept the second packet and transmit a first copy of the second packet to the second network device;
wherein the second network device is configured to receive the first copy of the second packet, extract the origin timestamp from the first copy of the second packet; and
wherein the second network device or a device separate from the second network device is configured to calculate link delay from the first network device to the second network device using the origin timestamp and the receive timestamp.

13. The system of claim 12 wherein the first and second network devices comprise network equipment test devices.

14. The system of claim 13 wherein the network equipment test devices are synchronized to a common clock source.

15. The system of claim 14 wherein the common clock source comprises a global positioning system (GPS) clock source.

16. The system of claim 12 wherein the network tap is local to the first network device and wherein the network tap is further configured to transmit a second copy of the second packet from the network tap to the first network device.

17. The system of claim 16 wherein the first network device discards the second copy of the second packet.

18. The system of claim 12 wherein the calculating the link delay using the origin timestamp and the receive timestamp includes subtracting the origin timestamp from the receive timestamp to obtain a link delay measurement.

19. The system of claim 18 wherein calculating the link delay includes adding a cable delay for a cable between the network tap and the first network device to the link delay measurement.

20. The system of claim 12 wherein calculating the link delay includes subtracting the origin timestamp from the receive timestamp.

21. The system of claim 12 wherein the network comprises an asymmetric network and wherein the first and second network devices are configured to switch roles, wherein the first network device or a device separate from the first network device is configured to calculate link delay from the second network device to the first network device.

22. A non-transitory computer readable medium having stored thereon executable instructions that when executed by a processor of a computer control the computer to perform steps comprising:
transmitting a first packet from a first network device;
using a network tap, passively intercepting the first packet, transmitting a first copy of the first packet to the first network device, and transmitting a second copy of the first packet to a second network device;
at the first network device, recording a time of receipt of the first copy of the first packet as an origin timestamp;
at the second network device, recording a time of receipt of the second copy of the first packet as a receive timestamp;
transmitting a second packet from the first network device, the second packet including the origin timestamp;
using the network tap, passively intercepting the second packet and transmitting a first copy of the second packet to the second network device;

at the second network device, receiving the first copy of the second packet, extracting the origin timestamp from the first copy of the second packet; and calculating link delay from the first network device to the second network device using the origin timestamp and the receive timestamp.

\* \* \* \* \*